United States Patent
Kawashima et al.

(10) Patent No.: US 6,654,006 B2
(45) Date of Patent: Nov. 25, 2003

(54) TOUCH PANEL FOR DISPLAY DEVICE INTEGRATED WITH FRONT LIGHT UNIT

(75) Inventors: Satoshi Kawashima, Iwata-gun (JP); Toshiaki Asakawa, Iwata-gun (JP)

(73) Assignee: Minebea Co., Ltd, Nagano-ken (JP)

(*) Notice: Subject to any disclaimer, the term of this patent is extended or adjusted under 35 U.S.C. 154(b) by 30 days.

(21) Appl. No.: 10/020,204

(22) Filed: Dec. 18, 2001

(65) Prior Publication Data

US 2002/0075245 A1 Jun. 20, 2002

(30) Foreign Application Priority Data

Dec. 20, 2000 (JP) .................................... 2000-387641

(51) Int. Cl.[7] .................................................. G09G 5/00
(52) U.S. Cl. .................... 345/173; 178/18.05; 349/62
(58) Field of Search ............................. 345/173, 176; 349/63, 62; 341/20, 22; 428/141, 143, 149; 178/18.05

(56) References Cited

U.S. PATENT DOCUMENTS

| | | | | |
|---|---|---|---|---|
| 4,990,900 A | * | 2/1991 | Kikuchi | 345/174 |
| 5,925,438 A | * | 7/1999 | Ota et al. | 428/141 |
| 6,323,919 B1 | * | 11/2001 | Yang et al. | 349/63 |
| 6,522,322 B1 | * | 2/2003 | Maeda et al. | 345/173 |

FOREIGN PATENT DOCUMENTS

JP   2000-187197   7/2000

* cited by examiner

Primary Examiner—Amare Mengistu
(74) Attorney, Agent, or Firm—Nath & Associates PLLC; Gary M. Nath; Marvin C. Berkowitx

(57) ABSTRACT

A touch panel for a display device is structured such that one resistive layer of a pair of resistive layers disposed opposing each other across a plurality of insulating dot spacers is laid on a flat hard glass plate which is integrally combined with a light conductive plate of a front light unit sandwiching elastic spacers. The total thickness measuring when a touch panel is attached to a display device, is reduced, and the accuracy of the information on the position, the display quality and the durability are improved.

6 Claims, 3 Drawing Sheets

TOUCH PANEL FOR DISPLAY DEVICE INTEGRATED WITH FRONT LIGHT UNIT

BACKGROUND OF THE INVENTION

1. Field of the Invention

The present invention relates to a touch panel for a display device which is disposed close to a display surface of a display device such as a liquid crystal display device and generates a specified signal corresponding to a position touched when an operator touches a desired position on a panel surface with a pen or a finger based on information displayed on the display surface.

2. Description of the Related Art

Since the panel surface of this type of a touch panel can be used for both display and input of information, the utilization factor of the panel surface is increased, and there is a growing demand for the touch panel in compact information processors and communications equipments, in particular, mobile communications terminals.

FIG. 4 is a sectional view of a conventional touch panel (disclosed in FIG. 2 in Japanese Unexamined Patent Application Publication No. 2000-187197).

As shown in FIG. 4, a touch panel 10 basically comprises a pair of resistive layers (first and second resistive layers) 12 and 13 disposed opposite to each other across a plurality of insulating dot spacers 11, with the second resistive layer 13 being laid on a flat transparent glass plate 16 so as to be reinforced as well as protected, and is disposed close to a display device 30 such that the glass plate 16 faces the display surface of the display device 30.

In this construction, when an outer surface of the first resistive layer 12 is touched to be pressed, a touched portion of the first resistive layer 12 is brought into contact with a portion opposite thereto of the second resistive layer 13, and a signal corresponding to the contact position (touched position) is generated.

In a practical construction, a transparent layer, for example, a transparent film (PET film or the like) 15 is laminated on an outer surface of the first resistive layer 12 for protection thereof, so the touching operation is implemented on this transparent film 15.

The first and second resistive layers 12 and 13 are combined at their peripheries by means of a sealing member 14 thereby making them dustproof and waterproof.

A light unit is added to the above-described display device 30 to illuminate the display surface brightly for making it easy to observe. A front light unit 20 to shine light on a front face (display surface) of the display device 30 is often used as the light unit in recent years.

FIG. 4 shows the touch panel 10 attached to the display device 30 having the front light unit 20 above described.

As shown in FIG. 4, the front light unit 20 has a light conductive plate 22 disposed facing the display surface of the display device 30, and guides light emitted from a light source 21 located along the light source 21 toward the display surface of the display device 30 through the light conductive plate 22. The light made incident on the display surface enters the display device 30, is reflected at a bottom surface thereof, travels through the light conductive plate 22 and the touch panel 10, and exits out (refer to an arrow indicated by a broken line in the figure), whereby an image on the display surface is visualized.

An array of prisms whose respective ridges are parallel to each other is formed on a surface opposite to a surface facing the display surface of the display device 30 so that, as described above, the light conductive plate 22 can guide light coming therein from its end toward the display surface of the display device 30 disposed therebelow.

However, in the conventional technology shown in FIG. 4, since the touch panel 10 and the front light unit 20 are constituted independent of each other, there is a problem that the whole thickness (the depth) D of the display device 30 is increased when the touch panel and the front light unit are attached to the display device 30. There is another problem that since the light conductive plate 22 is brought into a direct contact with the glass plate 16, the light conductive plate 22 can be damaged or broken by the glass plate 16 when a vibration or shock is applied to the touch panel 10.

Thus, a touch panel for a display device (the touch panel shown in FIG. 1 in the above-described Japanese Unexamined Patent Application Publication) was disclosed, where, as shown in FIG. 5, a second resistive layer 13 of a touch panel 10 is in a close contact with a surface of a light conductive plate 22, on which the array of prisms is formed.

In this touch panel, a member (the glass plate 16 in FIG. 4) interposed between the light conductive plate 22 and the second resistance layer 13 of the touch panel 10 is eliminated, and the touch panel 10 is integrated with the front light unit 20, and thus, the whole thickness D can be reduced when the touch panel and the front light unit are attached to the display device 30. Further, the glass plate 16 in FIG. 4 is not present, and thereby the problem that the light conductive plate 22 is damaged or broken by the glass plate when a vibration or shock is applied to the touch panel 10 can be solved.

However, there is a problem described below in the conventional technology shown in FIG. 5.

Since the second resistive layer 13 is in a close contact with the surface of the light conductive plate 22, on which the array of prisms is formed, as described above, a surface facing a first resistive layer 12 is also uneven corresponding to the surface of the array of prisms, and insulating dot spacers 11 are interposed between the uneven surface of the second resistive layer 13 and a flat surface of the first resistive layer 12.

Thus, the linearity of the resistance value at each position on a touch panel operation surface (a surface of a transparent film 15) is difficult to ensure, and errors occur easily in information obtained on the position.

It is also difficult to dispose each of the insulting dot spacers 11 constituting the touch panel 10 on the second resistance layer 13 to a uniform height, and thus the transparent film 15 constituting the touch panel operation surface becomes wavy, and the display quality is degraded.

In addition, there is a durability problem that projecting portions of the prisms formed on the one surface of the light transmission plate 22 and projecting portions of the second resistive layer 13 to cover the light conductive plate are easily damaged while the touch panel 10 is used.

SUMMARY OF THE INVENTION

Accordingly, it is an object of the present invention to provide a touch panel for a display device, which combines advantages of the conventional technologies shown in FIGS. 4 and 5, that is, the whole thickness is not increased excessively when the touch panel is attached to the display device, the light conductive plate is not damaged or broken when a vibration or shock is applied to the touch panel, no errors occur in information obtained on the position, the touch panel operation surface does not become wavy, the display quality is not degraded, and the durability is excellent.

According to the present invention, in a touch panel for a display device, which has one resistive layer of a pair of resistive layers, that are disposed opposing each other across a plurality of insulating dot spacers, being laid on a flat translucent hard plate, is disposed along a display device with the translucent hard plate facing toward a display surface of the display device while a front light unit comprising a light source and a light conductive plate in which an array of prisms whose respective ridges are parallel to each other is formed on a surface opposite to a surface facing the display surface of the display device so as to guide light emitted from the light source toward the display surface of the display device is interposed therebetween, and which is adapted to generate a signal by touching an outer surface of the other resistive layer according to a position touched, the light conductive plate and the translucent hard plate are integrally combined with each other sandwiching elastic spacers.

In the touch panel according to the present invention, the elastic spacers are constituted by a plurality of elastic dot spacers.

In the touch panel according to the present invention, the elastic spacers are constituted by a gel or liquid translucent substance having a low refractive index.

In the touch panel according to the present invention, the elastic spacers are constituted by a gel or liquid translucent substance, and a layer formed of a translucent substance having a low refractive index is disposed in a tight contact with a surface of the array of prisms formed on the light conductive plate.

DESCRIPTION OF THE PREFERRED EMBODIMENTS

Preferred embodiments in accordance with the present invention will be described below.

Figure 1:
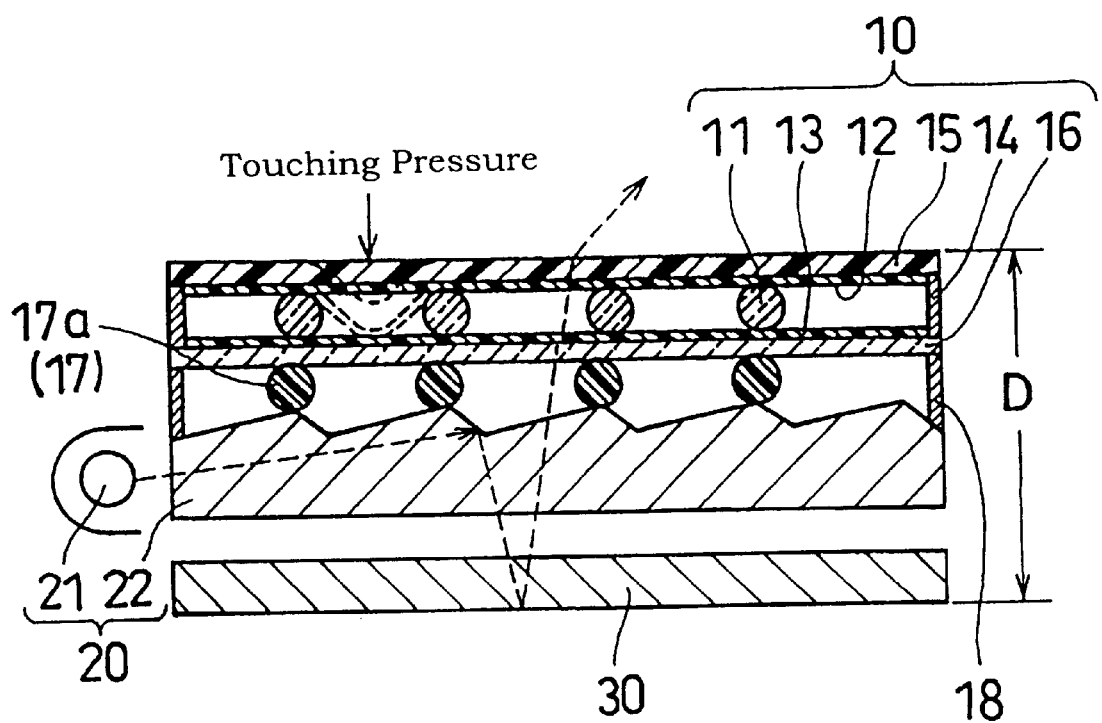
FIG. 1 is a sectional view of a first embodiment of a touch panel for a display device in accordance with the present invention.

FIG. 1 is a sectional view of a first embodiment of a touch panel for a display device in accordance with the present invention.

As shown in the figure, a touch panel 10 according to the first embodiment basically comprises a pair of resistive layers, for example, ITO films (first and second ITO films) 12 and 13 disposed opposite to each other across a plurality of insulating dot spacers 11. A flat translucent hard plate, for example, a transparent glass plate 16 is laminated on the second ITO film 13 for protection thereof, and the touch panel 10 is disposed close to a display device 30 such that this glass plate 16 faces a display surface of the display device 30, i.e., a liquid crystal display device in this embodiment.

In such a construction, when an outer surface of the first ITO film 12 is touched to be pressed, the touched portion of the first ITO film 12 is brought into contact with a portion opposite thereto of the second ITO film 13, and a signal corresponding to the contact position (the touched position) is generated.

In a practical construction, a translucent layer, i.e., a PET (polyethylene terephthalate) film 15 in this embodiment is laminated on the outer surface of the first ITO film 12 for protection thereof, and thus the touching operation is implemented on this PET film 15.

The first and second ITO films 12 and 13 are combined at their peripheries by means of a sealing member 14 to make the ITO films dustproof and waterproof.

Figure 4:
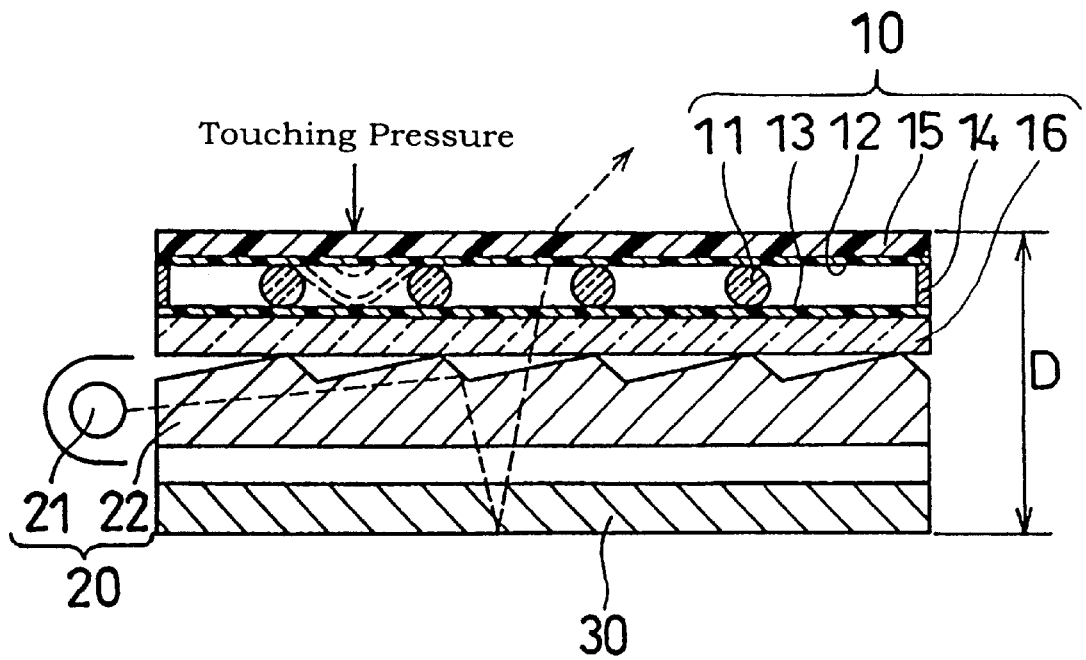
FIG. 4 is a sectional view of a conventional touch panel for a display device.

The above-described basic construction is not different from that of a conventional technology shown in FIG. 4; however, in the present invention, in a front light unit 20 having a light source 21 and a light conductive plate 22 to guide light from this light source 21 toward a display surface of the above-described display device 30, the light conductive plate 22 is structured integrally with the above-described glass plate 16 at an outer surface side thereof sandwiching a plurality of spacers 17 having elasticity and having a thickness of about 30 μm to 40 μm.

A plurality of elastic dot spacers 17a are used for the spacers 17 in this first embodiment. The plurality of elastic dot spacers 17a are formed by printing, for example, a silicone synthetic resin on an outer surface of the glass plate 16 at a certain interval.

The touch panel 10 is integrated with the light conductive plate 22 (the front light unit 20) by combining the glass plate 16 with the light conductive plate 22 at their peripheries by means of a jointing member 18 consisting of a pressure sensitive adhesive double coated tape or a resin. This jointing member 18 provides dustproof and waterproof functions between the glass plate 16 and the light conductive plate 22.

An array of prisms whose ridges are parallel to each other is formed on a surface opposite to a surface facing the display surface of the display device 30, and is adapted to guide light from the light source 21 toward the display surface of the display device 30.

In order for the light conductive plate 22 to guide (reflect) the light from the light source 21 toward the display surface of the display device 30, a relation of n1>n2 must be satisfied, where n1 denotes the refractive index of the light conductive plate 22 (refractive index relating to light), and n2 denotes the refractive index of a medium in contact with the surface of the array of prisms facing the glass plate 16.

The light conductive plate 22 is formed of, for example, a transparent acrylic resin, and n1 is about 1.5; the above-described medium is an air present between the elastic dot spacers 17a in the first embodiment, and n2 is 1, and hence the relation n1>n2 is satisfied.

Thus, light from the light source 21 travels in the light conductive plate 22, and is reflected at the surface of the array of prisms toward the display surface of the display device 30 to be shed thereon. The light entering the display device through its display surface is reflected at a bottom surface thereof, travels through the light conductive plate, an air layer present between the elastic dot spacers 17a and the touch panel 10, then exits out the touch panel (refer to an arrow indicated by a broken line in the figure), and thereby the display image of the display surface can be visualized.

Figure 2:
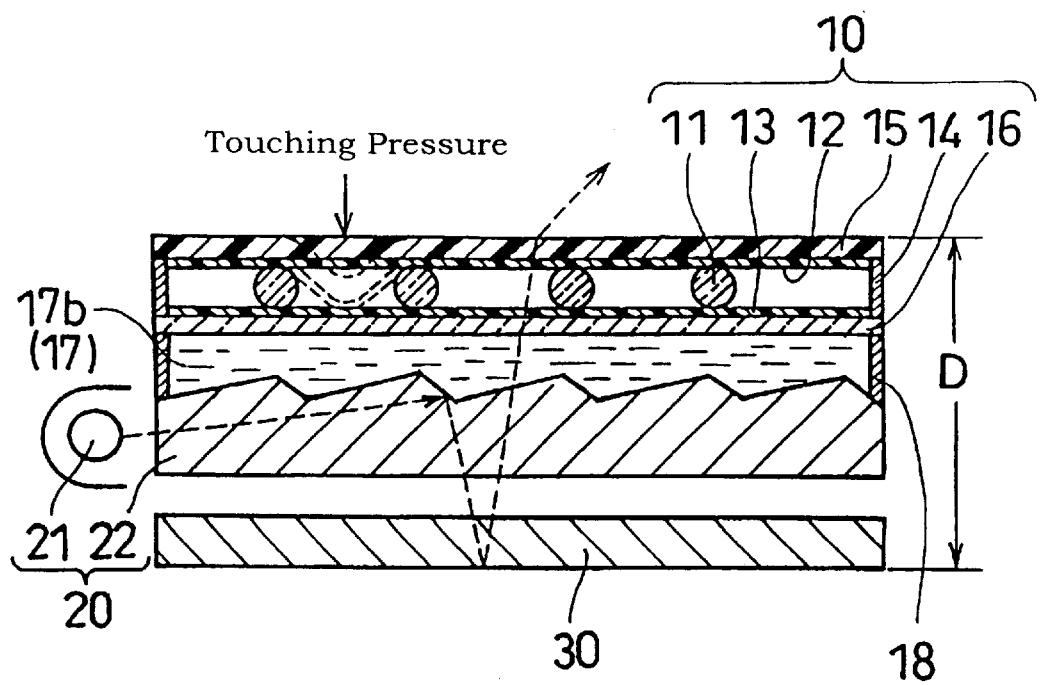
FIG. 2 is a sectional view of a second embodiment of a touch panel for a display device in accordance with the present invention.

FIG. 2 is a sectional view of a second embodiment of a touch panel for a display device in accordance with the present invention. In FIG. 2, same symbols are given to parts identical with or equivalent to those in FIG. 1, and the description thereof is omitted.

In the second embodiment, in integrating the touch panel with the light conductive plate 22 (the front light unit 20), a gel or liquid translucent substance having a low refractive index, for example, a transparent gel substance 17b having a low refractive index such as a silicone rubber is used for the elastic spacers 17 provided between the light conductive plate 22 and the glass plate 16. Here, the "low refractive index" is defined as a refractive index smaller than the refractive index n1 (=about 1.5) of the light conductive plate 22, and the difference from n1 is preferably made as large as possible.

In the second embodiment, the medium (the refractive index=n2) in contact with the surface array of prisms of the light conductive plate 22 is the transparent gel substance 17b low in refractive index.

Thus, also in the second embodiment, the above-described relation n1>n2 can be satisfied, and light from the light source 21 travels in the light conductive plate 22, and is reflected at the surface of the array of prisms toward the display surface of the display device 30 to be shed thereon. The light entering the display device 30 through its display surface is reflected at the bottom surface thereof, and travels through the light conductive plate 22, a layer formed of the transparent gel substance 17b low in refractive index and the touch panel 10, then exits out the touch panel (refer to an arrow indicated by a broken line in the figure), and the display image on the display surface can be visualized.

In the second embodiment, a gel or liquid translucent substance having a low refractive index, i.e., the transparent gel substance 17b low in refractive index is used here in place of the plurality of elastic dot spacers 17a in the above-described first embodiment, and the process of printing or the like on the glass plate 16 required for forming the plurality of the elastic dot spacers 17a is unnecessary.

Figure 3:
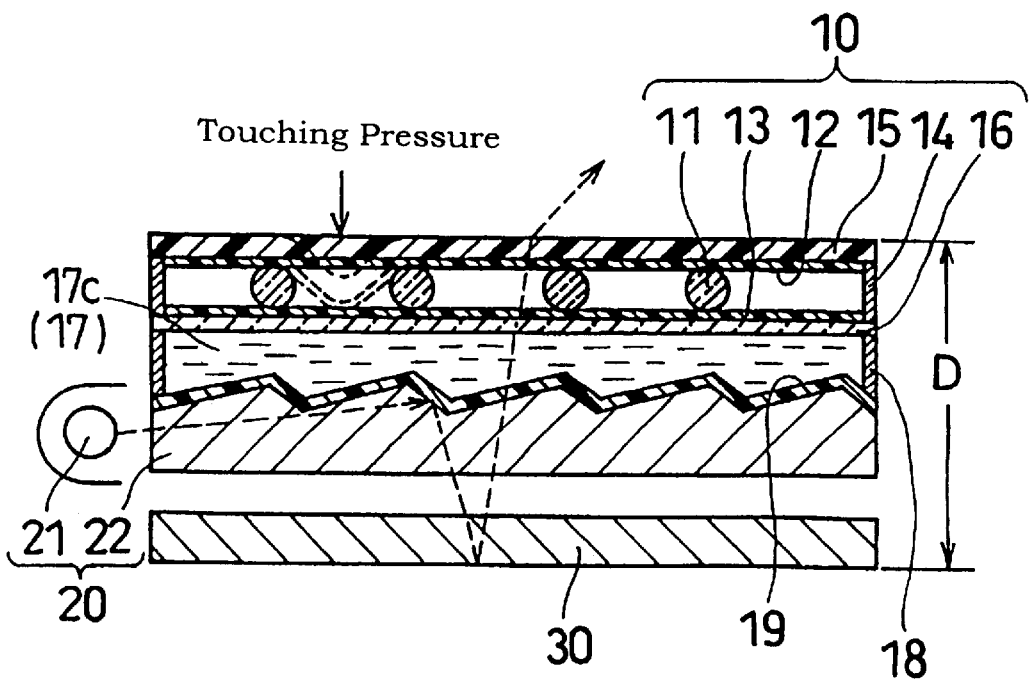
FIG. 3 is a sectional view of a third embodiment of a touch panel for a display device in accordance with the present invention.

FIG. 3 is a sectional view of a third embodiment of a touch panel for a display device in accordance with the present invention. In FIG. 3, same symbols are given to parts identical with or equivalent to those in FIGS. 2 and 3, and the description thereof are omitted.

In the third embodiment, in integrating the touch panel with the light conductive plate 22 (the front light unit 20), a gel or liquid translucent substance having a low refractive index, for example, a transparent gel substance 17c such as a silicone rubber is used for the elastic spacer 17 provided between the light conductive plate 22 and the glass plate 16. A layer formed of a translucent substance having a low refractive index, for example, a film 19 of a transparent substance low in refractive index such as $SiO_2$ of several $\mu$m in thickness is disposed in a tight contact with a surface of the array of prisms (a surface facing the glass plate 16) of the light transmission plate 22.

In the third embodiment, the medium (the refractive index=n2) in contact with the surface of the array of prisms of the light conductive plate 22 is the film 19 formed of a transparent substance low in refractive index.

Thus, also in the third embodiment, the above-described relation n1>n2 can be satisfied, and light from the light source 21 travels in the light conductive plate 22, and is reflected at the surface of the array of the prisms toward the display surface of the display device 30 to be shed thereon. The light entering the display device 30 through its display surface is reflected at the bottom surface thereof, and travels through the light conductive plate 22, the film 19 of a transparent substance low in refractive index, the layer of the transparent gel substance 17c and the touch panel 10, then exits out the touch panel (refer to an arrow indicated by a broken line in the figure), and the display image on the display surface can be visualized.

In the third embodiment, a gel or liquid translucent substance having a low refractive index, i.e., the transparent gel substance 17b low in refractive index is used here for the elastic spacers 17 constituted by the plurality of elastic dot spacers 17a in the above-described first embodiment, and the process of printing or the like on the glass plate 16 required for the plurality of the elastic dot spacers 17a is unnecessary.

The medium (the refractive index=n2) in contact with the surface of the array of prisms of the light transmission plate 22 is the film 19 formed of a transparent substance low in refractive index, and thereby the above-described relation n1>n2 can be satisfied. Thus, in selecting the gel or liquid translucent substance (the transparent gel substance 17c) used for the elastic spacers 17, its refractive index need not be taken into consideration, thereby increasing the range of selection.

Figure 5:
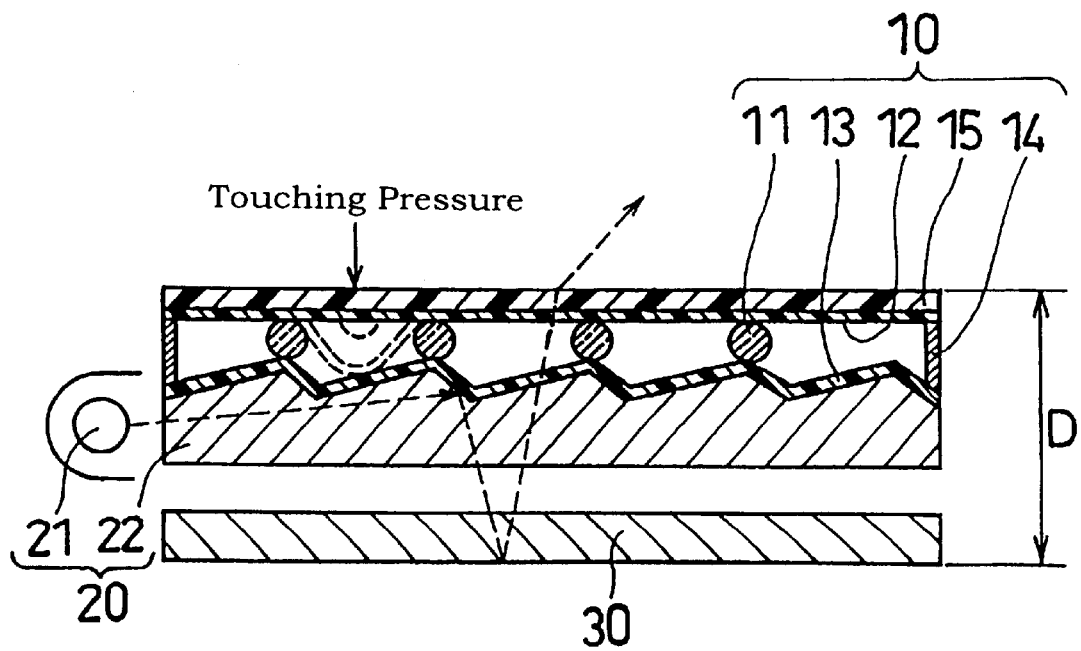
FIG. 5 is a sectional view of a conventional touch panel for a display device, in which a second resistive layer is tightly attached to a surface of a light conductive plate of a front light unit.

Since, as described above, the present invention basically has the similar construction to that of a conventional technology shown in FIG. 4, where one resistive layer of a pair of resistive layers disposed facing each other across insulating dot spacers is laid on a flat translucent hard plate, the advantages by the same constitution are available, and at the same time the problems of the conventional technology shown in FIG. 5 can be solved.

This means that since the one resistive layer which is pressed by way of the insulating dot spacers is supportedly laid on the flat translucent hard plate, the linearity of the resistance value at each position on the touch panel operation surface (the transparent film surface) is well ensured, and the accuracy of the information obtained on the position is not degraded.

Further, each of the insulating dot spacers to constitute the touch panel can be disposed on the one resistive layer to a uniform height in an extremely easy manner, and thus the transparent film (such as PET film) laminated on the other resistive layer and constituting the touch panel operation surface does not become wavy and the display quality is not degraded.

In addition, the insulating dot spacers are pressed against a flat inner surface of the one resistive layer laid on the flat translucent hard plate, and thus the one resistive layer is not damaged, thereby providing an excellent durability.

On the other hand, since, in the present invention, the light conductive plate of the front light unit is attached to the outer surface of the translucent hard plate in an integrated manner, the strength of the touch panel as a single unit against a vibration or shock during conveyance is no longer required thereby allowing the thickness of the translucent hard plate to be reduced to ½ to ⅓ of a conventional value of about 0.4 mm, and the problems with the conventional technology shown in FIG. 4 can be solved while taking advantage of the integration structure.

This means that the whole thickness (the depth) D can be reduced when the touch panel and the front light unit in accordance with the present invention are attached to the display device. In addition, since the light conductive plate is integrated with the touch panel sandwiching the elastic spacers and thereby not brought into a direct contact with the translucent hard plate such as a glass plate, the light conductive plate is not damaged or broken by the translucent hard plate when a vibration or shock is applied to the touch panel.

What is claimed is:

1. A touch panel for a display device, comprising:

a pair of resistive layers disposed facing each other across a plurality of insulating dot spacers, a first resistive layer being laid on a flat translucent hard plate, said translucent hard plate facing toward a display surface of said display device; and a front light unit interposed between said display surface of said display device and said pair of resistive layers, said front light unit comprising a light source and a light conductive plate in which an array of prisms, whose respective ridges are parallel to each other, is formed on a surface opposite to a surface facing said display device so as to guide light emitted from said light source toward said display surface of said display device;

the touch panel being adapted to generate a signal by touching an outer surface of a second resistive layer according to a position touched, wherein said light conductive plate and said translucent hard plate are integrally combined with each other and sandwich elastic spacers therebetween.

2. A touch panel for a display device according to claim 1, wherein said elastic spacers are constituted by a plurality of elastic dot spacers.

3. A touch panel for a display device according to claim 1, wherein said elastic spacers are constituted by a gel translucent substance having a low refractive index.

4. A touch panel for a display device according to claim 1, wherein said elastic spacers are constituted by a liquid translucent substance having a low refractive index.

5. A touch panel for a display device according to claim 1, wherein said elastic spacers are constituted by a gel translucent substance, and a layer formed of a translucent substance having a low refractive index is disposed in a tight contact with a surface of said array of prisms formed on said light conductive plate.

6. A touch panel for a display device according to claim 1, wherein said elastic spacers are constituted by a liquid translucent substance, and a layer formed of a translucent substance having a low refractive index is disposed in a tight contact with a surface of said array of prisms formed on said light conductive plate.

* * * * *